United States Patent [19]
Martin

[11] Patent Number: 5,908,218
[45] Date of Patent: Jun. 1, 1999

[54] DEVICES FOR RESTRICTING THE MOVEMENTS OF OBJECTS

[76] Inventor: Steve Martin, P.O. Box 929, Beverly Hills, Calif. 90213

[21] Appl. No.: 09/006,419

[22] Filed: Jan. 13, 1998

[51] Int. Cl.⁶ ............................................. A47C 7/62
[52] U.S. Cl. .............. 297/182; 297/188.01; 297/188.06; 297/188.07; 297/188.08; 297/188.11; 297/188.12; 297/188.13; 312/235.8
[58] Field of Search .............................. 297/182, 188.01, 297/188.06, 188.07, 188.08, 188.11, 188.12, 188.13, 188.2; 312/235.8, 330.1

[56] References Cited

U.S. PATENT DOCUMENTS

| | | | |
|---|---|---|---|
| 2,633,180 | 3/1953 | Reed | 312/235.8 X |
| 2,692,638 | 10/1954 | Castell | 312/235.8 X |
| 2,748,841 | 6/1956 | Rimkus | 297/188.12 |
| 2,958,499 | 11/1960 | Sterner | 297/188.11 X |
| 3,026,141 | 3/1962 | Welles | 297/188.11 |
| 3,061,394 | 10/1962 | Whetstone | 312/235.8 X |
| 3,131,813 | 5/1964 | Jensen | 297/188.11 X |
| 3,169,781 | 2/1965 | Abruzzino . | |
| 3,295,887 | 1/1967 | Bacon | 297/188.2 |
| 3,309,135 | 3/1967 | Jannetto | 297/188.01 |
| 3,321,237 | 5/1967 | Gangell | 297/188.11 X |
| 3,338,629 | 8/1967 | Drees | 312/235.8 |
| 3,345,118 | 10/1967 | Cummings | 212/235.8 |
| 3,623,683 | 11/1971 | Bennett | 297/188.11 X |
| 3,922,973 | 12/1975 | Sturgeon | 312/235.8 X |
| 3,951,486 | 4/1976 | Tracy | 312/235.8 |
| 4,924,814 | 5/1990 | Beaudet . | |
| 4,927,200 | 5/1990 | Wilkins | 297/188.2 X |
| 4,943,105 | 7/1990 | Kacar et al. . | |
| 5,096,249 | 3/1992 | Hines | 297/188.11 X |
| 5,358,307 | 10/1994 | Shafer et al. | 297/188.01 X |
| 5,586,806 | 12/1996 | Hergott | 297/188.11 |

Primary Examiner—Jose V. Chen
Assistant Examiner—Rodney B. White
Attorney, Agent, or Firm—Bryan Cave LLP

[57] ABSTRACT

Movements of objects are restricted by a device having a housing unit having a first face wall portion and a second face wall portion and having side wall portions which extend between and are integral with the face wall portions so that the wall portions define an exterior housing wall surface and an interior housing wall surface which defines a housing unit cavity and having an opening which extends from the exterior wall surface through the interior wall surface and into the cavity. A reciprocable member having a first face wall portion and a second face wall portion and having side wall portions which extend between and are integral with the reciprocable member face wall portions and which is configured and positioned for reciprocable movement from and between a position where substantially all of the reciprocable member is contained by the housing unit within the cavity, to a position where the reciprocable member is extended from the housing unit so that less than substantially all of the reciprocable member is contained by the housing unit within the cavity. The device may be affixed to the seat portion of a vehicle seat, or contained in the seat portion, or it may be positioned below the seat portion for extending above and transversely with respect to the seat portion and substantially parallel to the back portion of a vehicle seat.

10 Claims, 9 Drawing Sheets

DEVICES FOR RESTRICTING THE MOVEMENTS OF OBJECTS

FIELD OF THE INVENTION

The present invention relates to devices for restricting the movements of objects. More particularly, it relates to devices for restricting the movements of objects situated on a vehicle seat to restrict the objects from moving off of the seat.

BACKGROUND OF THE INVENTION

When people intend to travel to a destination, whether it be for short or long periods of time, it is common for them to bring articles or objects which they will need during the course of the day or which they will have acquired during the course of their travel. When people are commuting by vehicle to an appointment, meeting or place of employment, they generally have a tendency to place articles, such as documents, files or other personal objects, which they will need onto a seat next to which they are seated.

A problem which often arises during travel in a vehicle, due to the nature of the mode of transportation, is that objects which have been placed by an individual onto a seat, next to the seat in which the individual is seated, are subject to sudden or abrupt starts and stops as well as the force of turns made by the vehicle. As a result, since the objects situated on the seat next to the individual are not restricted in their movements, they move off of the seat and are dispersed onto the floor area of the vehicle. The dispersed objects or articles must then be collected by the individual and reorganized. This is time consuming, and often the items are so dispersed that they are not entirely recovered, or if they are all recovered they may be damaged. The individual is therefore left without items which are necessary for the course of the events in which the individual is to engage.

Although this problem is encountered by most people on a daily basis, no satisfactory solution has been developed to address this problem. For example, Bacon, U.S. Pat. No. 3,295,887 discloses a carrier device for elongated articles wherein a flexible cover extends over a seat portion of a vehicle seat and is secured to the vehicle seat, and an envelope-like compartment is attached to the cover and positioned at a position below a level of the covered seat portion.

Other documents evidence a lack of appreciation for this need and, instead, are directed to safety devices which are applied to vehicle seats. For example, Kacar, et al., U.S. Pat. No. 4,943,105 discloses a device for supporting and protecting a pet or cargo in a back seat of a vehicle. Beaudet, U.S. Pat. No. 4,924,814 discloses an apparatus for constraining an animal behind a driver's seat of a vehicle wherein a net is stretched across the interior of a vehicle at a position behind the driver's seat. Abruzzino, U.S. Pat. No. 3,169,781 discloses a safety device for an automobile wherein a safety net is positioned and secured at a position behind a driver's seat in an automobile.

SUMMARY OF THE INVENTION

The present invention provides a device for restricting the movements of objects. More particularly, the present invention provides a device for restricting the movements of objects or items which are situated on a seat of a vehicle.

In a first embodiment of the invention, the device includes a unit which houses a reciprocable pull-up center piece member. The reciprocable member can be adjusted to extend from a position wherein it is contained in the housing unit to a position transverse to and above a height level of a seat portion of a vehicle seat so that it is substantially parallel to a back portion of the vehicle seat. Means are provided for fixedly positioning the reciprocable member at a position extended from the housing unit and above the height level of the seat portion of the vehicle seat. Means also are provided for securing the housing unit to the seat portion of the vehicle seat.

In an alternative embodiment, a reciprocable member is position for reciprocative movement out from and into a cavity in a seat portion of a vehicle seat. In another alternative embodiment, the reciprocable member is positioned at a position below the seat portion of a vehicle seat for reciprocative movement from a position below the vehicle seat to a position extended above the seat portion and substantially parallel with the back portion of the vehicle seat.

DETAILED DESCRIPTION OF THE INVENTION

In a first embodiment, the device includes a housing unit having first and second face wall portions and side wall portions which extend from and between and which are integral with the face wall portions, and which together define an exterior housing wall surface area and an interior housing wall surface area of the housing unit. As used herein, the term "integral" is meant to include solid single piece units and units which have connected sidewalls. The housing unit interior wall surface area defines a cavity within the housing unit.

The housing unit also has an opening which extends from the exterior wall surface into and through the interior wall surface and into the housing unit cavity for the reciprocable movement of the reciprocable member from and between a position where substantially all of the reciprocable member is contained within the housing unit, to a position where the reciprocable member is extended from and beyond the housing unit so that less than substantially all of the reciprocable member is contained within the housing unit. The opening which extends into the housing unit cavity may be in a side of the housing unit at a position between the face wall portions of the housing unit for the reciprocable movement of the reciprocable member. Alternatively, the opening may be positioned in a side wall portion of the housing unit for the reciprocable movement of the reciprocable member.

The reciprocable member has a first face wall portion and a second face wall portion and side wall portions which extend from and between and which are integral with the face wall portions of the reciprocable member. The reciprocable member has a size and is configured so that it is at least partially contained within the housing unit and the reciprocable member face wall portions may be substantially parallel to the housing unit face wall portions.

When the opening is in a side of the housing unit, the housing unit face and side wall portions guide the reciprocable member from a position contained within the housing unit to a position extended from and beyond the housing unit. When the opening is in a side wall portion of the housing unit, that side wall portion also guides the reciprocable member from a position contained within the housing unit to a position extended from and beyond the housing unit.

Alternatively, at least one track is recessed into a side wall portion or into a face wall portion of the reciprocable member for guiding the reciprocable member from a position wherein it is contained within the housing unit, to a position extended from and beyond the housing unit so that at least a portion of the reciprocable member is contained within the housing unit. Alternatively, a track may be recessed into a side wall portion or into a face wall portion of the housing unit interior wall surface area for guiding the reciprocable member from a position wherein it is contained within the housing unit, to a position extended from and beyond the housing unit so that at least a portion of the reciprocable member is contained within the housing unit. Preferably, two substantially parallel recessed tracks are provided for guiding the reciprocable member from a position contained within the housing unit to a position extended from the housing unit.

When the reciprocable member has a guide track, means for guiding the reciprocable member is positioned and extends from the interior surface of a side wall portion or a face wall portion of the housing unit and into the track of the reciprocable member. When, on the other hand, the housing unit has a guide track, means for guiding the reciprocable member is positioned and extends from a reciprocable member face wall portion or side wall portion, depending upon the location of the guide track, and into the track in the housing unit. The means for guiding may be a rivet or other element such as a raised portion which extends from the interior wall surface of the housing unit and into the track in the reciprocable member, or alternatively, which extends from the reciprocable member and into the track in the interior wall surface of the housing unit.

The housing unit may have any suitable shape, such as rectangular, square, oval or polygonal. When the housing unit is rectangular, it may have a width of about ⅜ inch, a length of about 14 inches and a height of about 8 inches.

The reciprocable member has a shape so that it is reciprocable into and out of the housing unit. Thus, the reciprocable member may have a shape such as rectangular, square, oval or polygonal. When the reciprocable member is rectangular, it may have a width of about ⅛ inch, a length of about 12 inches and a height of about 9 inches so that at least a portion of the reciprocable member extends beyond the housing unit. Alternatively, the reciprocable member may be completely recessed in the housing unit and a wall portion of the housing unit may be recessed for gripping the reciprocable member, for removing the reciprocable member from the housing unit.

When the reciprocable member is extended from the housing unit, a portion of the reciprocable member, such as about 1½ inches of the reciprocable member, remains contained within the housing unit.

The tracks of the reciprocable member may be positioned in a face wall portion together, so that each track is positioned at a position of about 2 inches from and adjacent to one of two opposing side wall portions of the reciprocable member.

Means for fixing the reciprocable member at a position contained within the housing unit and/or extended from the housing unit is provided at a position and extends from an interior wall surface of the housing unit. The means for fixing the reciprocable member may be a rivet, such as a spring loaded rivet or other element such as a spring loaded lever or a raised portion which extends from the interior wall surface of the housing unit and into a track or into another recessed portion which extends into a reciprocable member wall surface for fixing a position of the reciprocable member. The rivet may be made of a material such as metal or plastic. When the means for fixing is a spring loaded rivet, the rivet extends through the wall portion of the housing unit and has a grip portion for withdrawing the rivet from the track or from the recessed portion in the reciprocable member. When the means for fixing is a spring loaded lever or a raised portion, a portion of the lever or raised portion may be depressed to release the reciprocable member.

Alternatively, the means for fixing the reciprocable member may be a projection member such as a depressible tab or button which extends from a reciprocable member face surface and into and through an opening which extends through a face wall portion of the housing unit. Alternatively, the projection member may extend from a side wall portion of the reciprocable member and into and through an opening in a side wall portion of the housing unit.

Means for securing the housing unit to the seat portion of a vehicle seat also is provided. The means for securing may be, for example, a velcro belt which includes a hook strap and loop strap combination. The loop strap of the velcro belt has a loop side and an opposite flat side having an adhesive. The loop strap adhesive side may be affixed to a seat portion of a vehicle seat, such as by an adhesive, and in particular glue.

The hook strap of the velcro belt has a hook side and an opposite flat side which may have an adhesive. The hook strap flat side is adjacent to and contacts an exterior housing wall surface, such as a face wall portion surface, and when the flat side is an adhesive side, the adhesive side is fixed to the exterior face wall portion surface of the housing unit, by glue, and in particular by a heavy duty contact cement. Alternatively, the hook strap may be fixed to the housing unit with rivets, so that the opposite flat side is adjacent to and contacts an exterior face wall portion surface and the hooks of the strap extend away from the face wall portion and toward the loop strap. The rivets may be made of a material such as metal or plastic.

The housing unit may have slots which extend through the housing unit face wall portions at a position, with respect to the reciprocable member, adjacent either side wall portion of the reciprocable member when the reciprocable member is contained within the housing unit. The slots have a size which is sufficient for the hook strap to fit and pass through each of the slots in the housing unit. The hook strap may be threaded through the slots so that upon being threaded through the slots, the hook side of the hook strap extends away from a face wall portion surface of the housing unit to which it is adjacent at a position between the slots.

The corresponding loop strap is fixed to the seat portion of the vehicle seat so that the loop side of the strap extends away from a surface of the seat portion and toward the hook strap. The loop strap is positioned on the seat portion at a position below a height level of the seat portion of the vehicle seat. Preferably, the loop strap is positioned at a position of about 2 inches below the height level the seat portion.

Each of the hook and loop straps of the velcro belt may have a length and a width which is sufficient to secure the housing unit to the seat portion. For example, each strap of the belt may have a width and length of about 2 inches by about 36 inches.

The device according to the invention may be made of a material, such as plastic, and in particular black ABS plastic, or of a composite of plastic or a resin and paper, a wood or a wood composite, or of a light weight and durable metal such as aluminum or an alloy.

In operation, the loop strap of a velcro belt is fixed to the seat portion of a vehicle seat. The hook strap of the velcro belt is inserted through slots in the housing unit so that the hooks of the hook strap face away from an adjacent face wall portion of the housing unit and extend toward the loop strap and the seat portion. The hooks of the hook strap hook the loops of the loop strap and affix the device to the seat portion of a vehicle seat.

The reciprocable member is pulled from the housing unit where it is contained, to a position extended above and away from the housing unit so that the reciprocable member is positioned at a position transverse to and above a height level of the seat portion of a vehicle seat and substantially parallel to a back portion of the vehicle seat.

DETAILED DESCRIPTION OF THE DRAWINGS

As illustrated below, certain drawing figures are drawn with broken lines to indicate a see-through three dimensional view. Generally, the same elements are depicted by the same numerical designations illustrated below.

Figure 1:
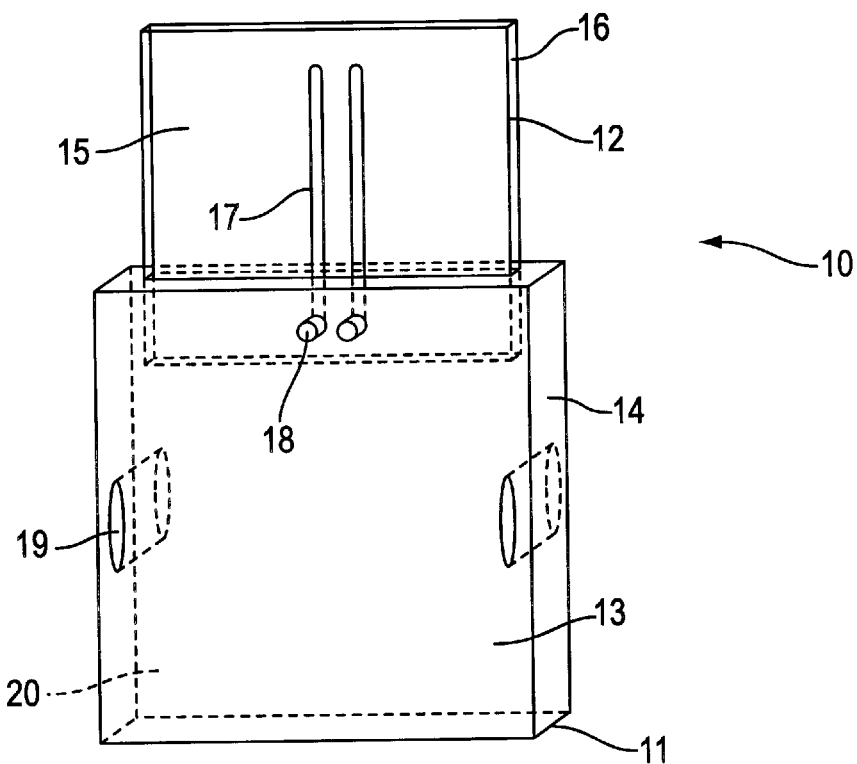
FIG. 1 is a view of the device having the reciprocable member extended from the housing unit.

In FIG. 1, the device, illustrated generally by number designation 10, has housing unit 11 with reciprocable member 12 in a position extended above and away from the housing unit. The housing unit 11 has face wall portions 13 and side wall portions 14. The reciprocable member has face wall portions 15 and side wall portions 16. Two tracks 17 are recessed in a surface of face wall portion 15 of the reciprocable member. Rivets 18 extend from an interior surface of a face wall surface of the housing unit into the tracks 17 in the reciprocable member. The housing unit has slots 19 which extend through the face wall portions 13 of the housing unit. The housing unit has an inner cavity shown generally by 20 (with the broken line indicating the cavity).

Figure 2:
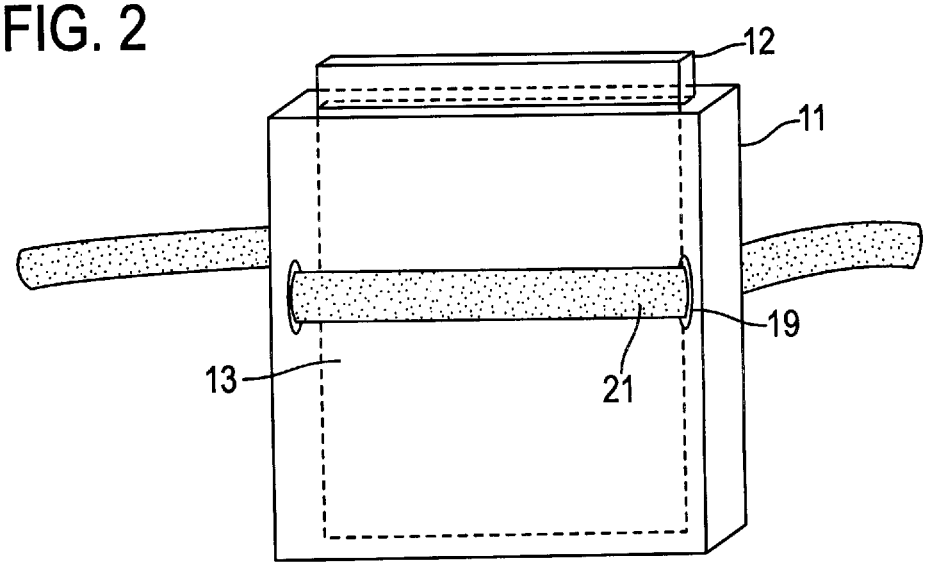
FIG. 2 is a view of the device having the reciprocable member contained in the housing unit and illustrating the hook strap of a velcro belt.

In FIG. 2, the reciprocable member 12 is shown in a position where it is contained in the housing unit 11. The hook strap 21 of a velcro belt is threaded through slots 19 so that the hooks of the hook strap extend away from face wall portion 13.

Figure 3:
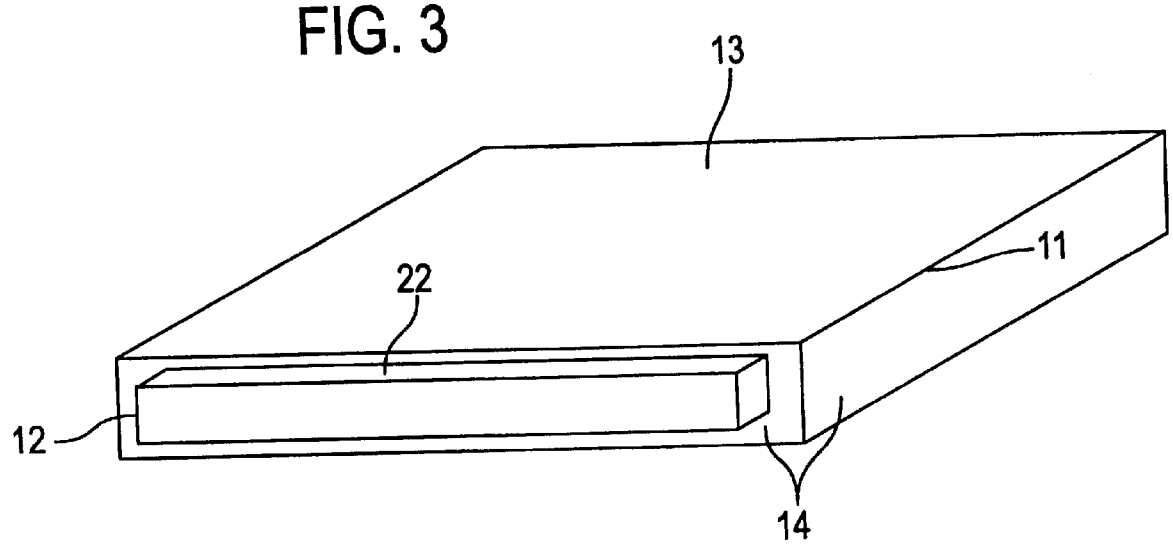
FIG. 3 is a perspective view of the device having the reciprocable member contained within the housing unit.

In FIG. 3, the housing unit 11 is shown with side wall portions 14 which extend from and between and which are integral with face wall portions 13 of the housing unit. Reciprocable member 12 is slightly extended from the housing unit. A side wall portion 14 of the housing unit 11 has an opening 22 for the reciprocable movement of the reciprocable member 12.

Figure 4:
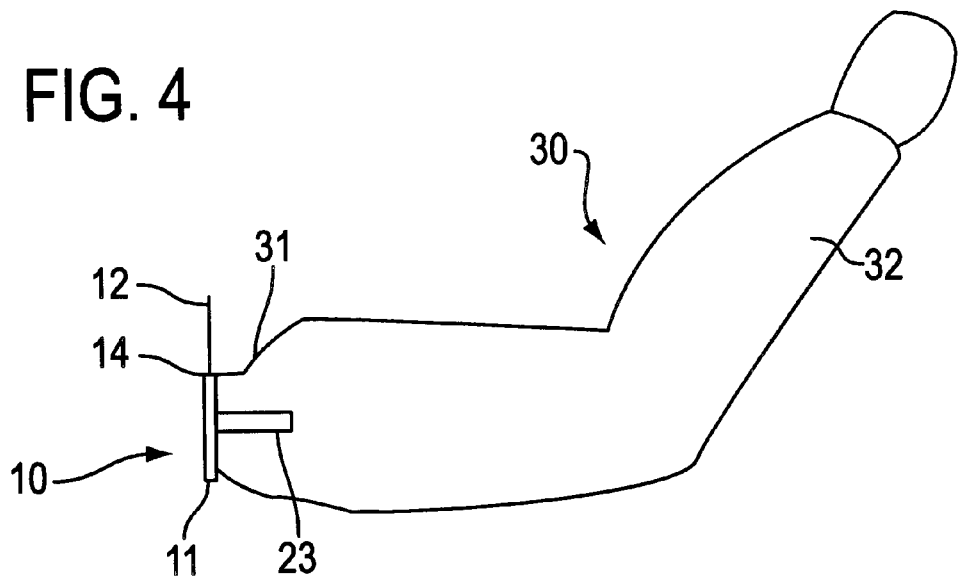
FIG. 4 is a diagrammatic side view of the device secured to a seat portion of a vehicle seat.
Figure 5:
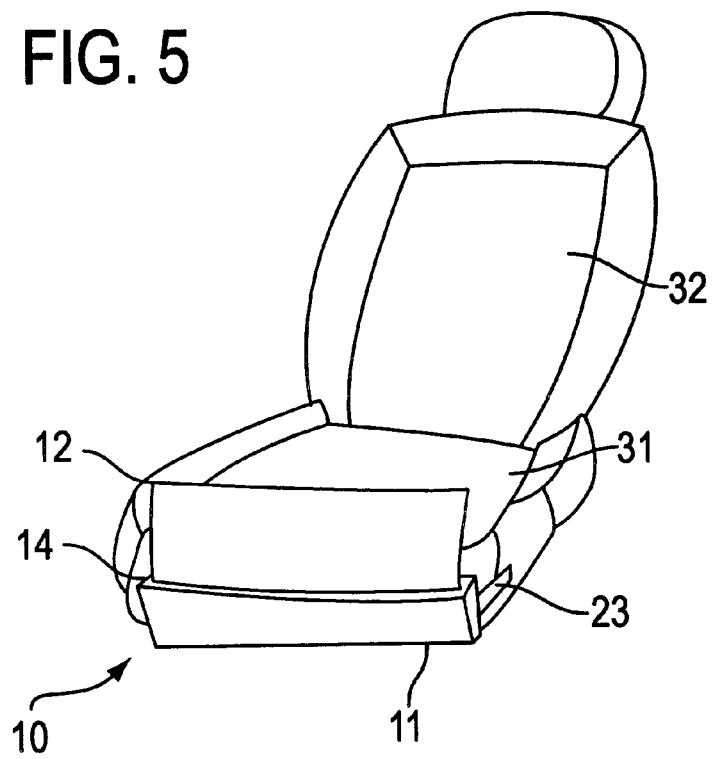
FIG. 5 is a frontal view of FIG. 4.

FIG. 4 illustrates a side view, and FIG. 5 illustrates a frontal view, of the device 10 affixed to a seat portion 31 of a vehicle seat (generally designated numerically as 30) having back portion 32. The velcro belt 23 is positioned below the level of the seat portion 31 of the seat 30 so that a side wall portion 14 of the device is approximately at a level which is about even with the seat portion 31 of the vehicle seat.

The reciprocable member 12 is extended from the housing unit 11 to a position which is substantially parallel to the back portion 32 of the vehicle seat and which is substantially transverse to and above a height level of the seat portion 31 of the vehicle seat. In this position, the device restricts the movement of objects.

Figure 6A:
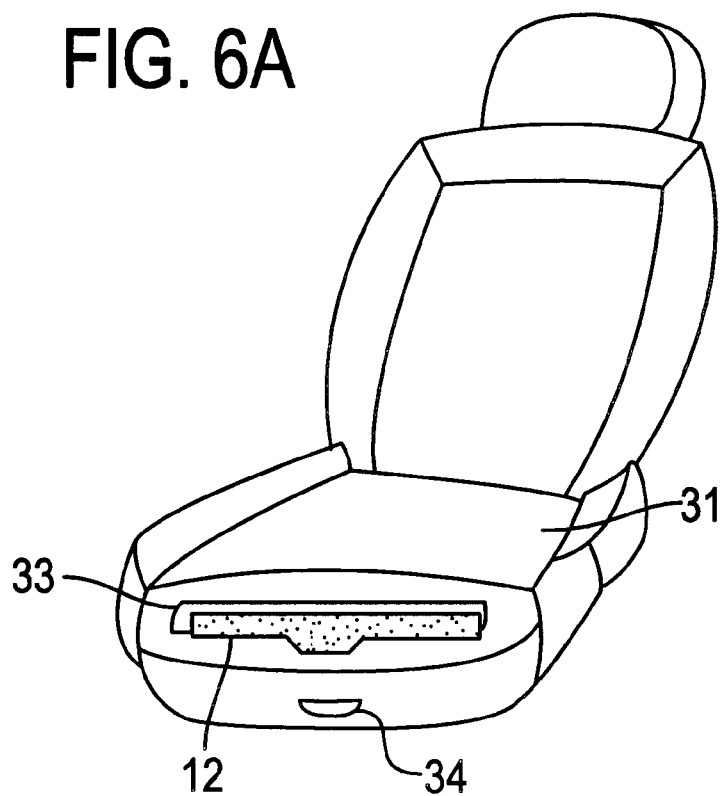
FIG. 6(a) is an illustration of an alternative embodiment wherein the device is contained in cavity of a seat portion of a vehicle seat.
Figure 6B:
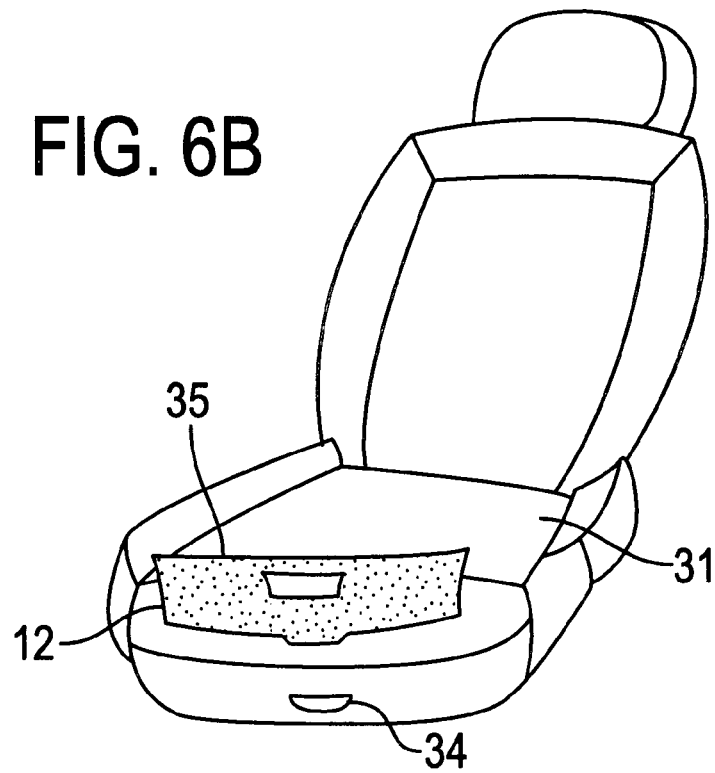
FIG. 6(b) is an illustration of FIG. 6(a) wherein the reciprocable member is extended from the seat portion.

FIG. 6(a) is an illustration of an alternative embodiment wherein the reciprocable number 12 is contained in a cavity 33 in a seat portion 31 of a vehicle seat. FIG. 6(b) is an illustration of FIG. 6(a) wherein the reciprocable member is extended from the seat portion. A release button 34 is conveniently positioned for fixing the position of the reciprocable member and for releasing the reciprocable member.

Figure 7A:
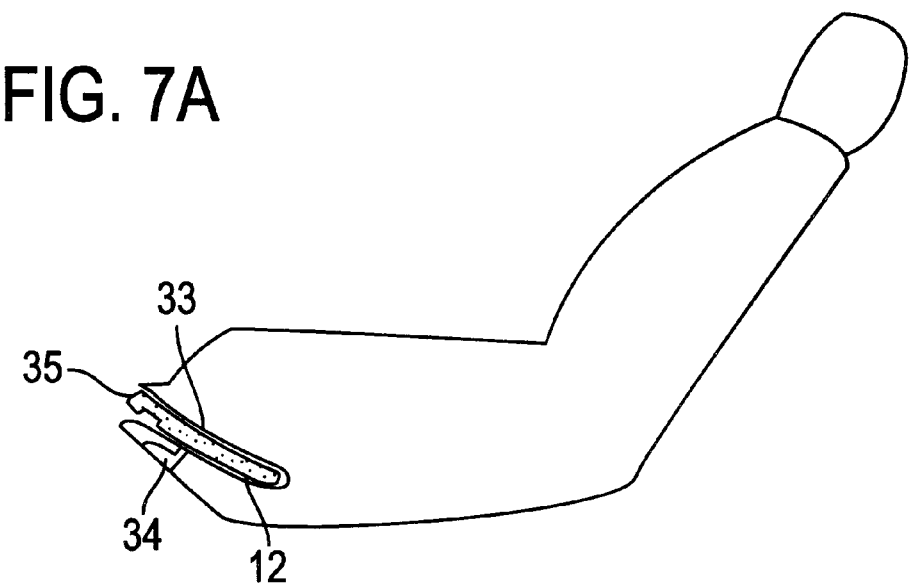
FIG. 7(a) is a cross section of a side view of FIG. 6(a)
Figure 7B:
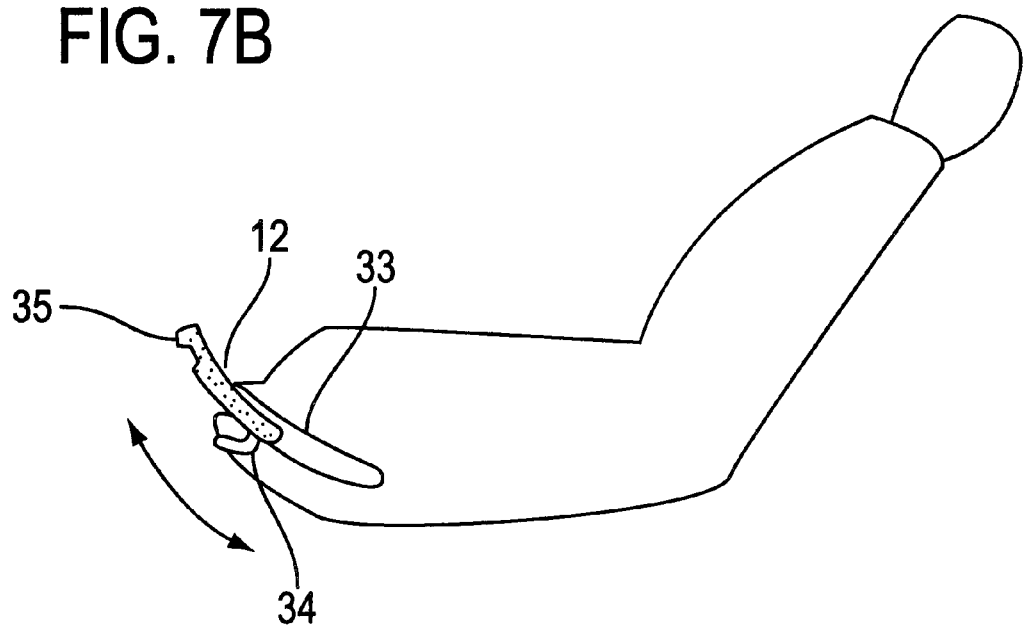
FIG. 7(b) is a cross section of a side view of FIG. 6(b).

As can be seen in FIG. 7(a), the reciprocable member is positioned in the cavity for sliding engagement with the release button which fixes the position of the reciprocable member. In FIG. 7(b), the reciprocable member is fixedly positioned in a position extended from the cavity in the seat portion. The reciprocable member may be ejected, such as by an ejection means, such as a spring, from the cavity in the seat portion upon depressing the release button, or may be removed from the cavity by pulling the gripping portion 35 of the reciprocable member. The reciprocable member may be retained and guided by tracks in the seat portion. The tracks may be of a tongue and groove relationship with the side wall portions of the reciprocable member.

Figure 8A:
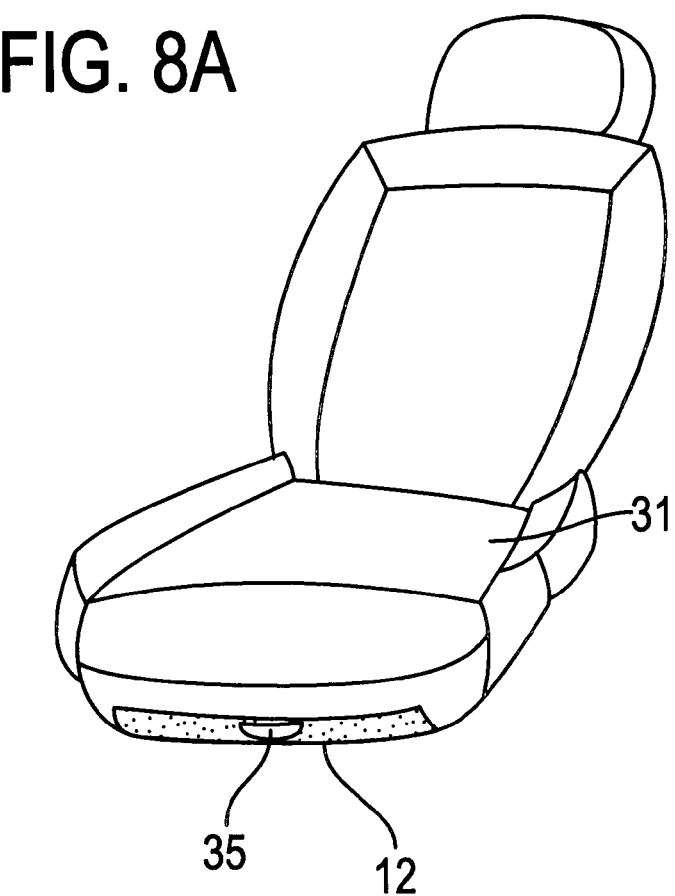
FIG. 8(a) is an illustration of an alternative embodiment wherein the device is positioned beneath a seat portion of a vehicle seat.
Figure 8B:
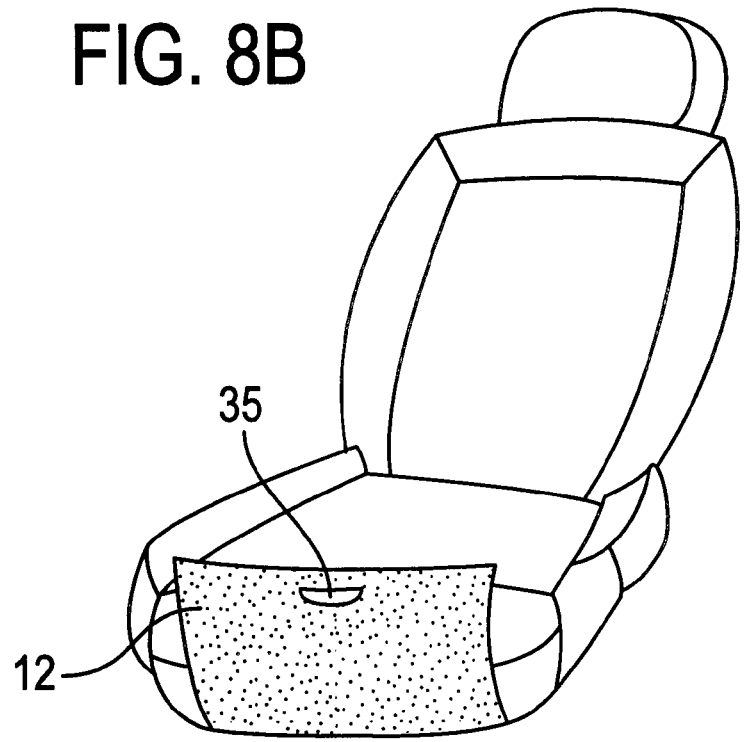
FIG. 8(b) is an illustration of FIG. 8(a) wherein the reciprocable member is extended from a position below the seat portion.

In the embodiment shown in FIG. 8(a), the device is positioned below a seat portion of a vehicle seat. The reciprocable member may be raised, as shown in FIG. 8(b), by the gripping portion 35 and extended from below the seat portion.

Figure 9A:
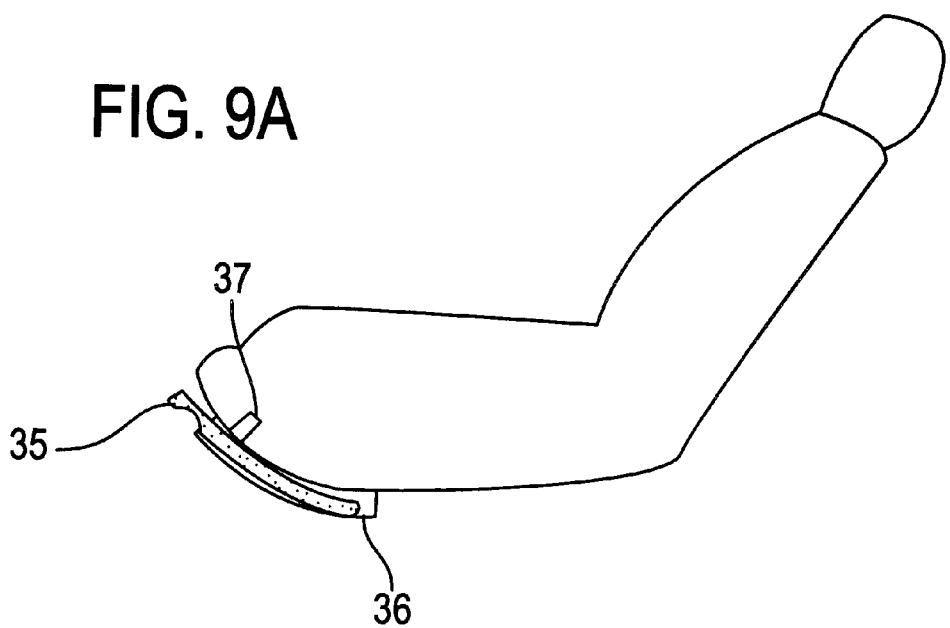
FIG. 9(a) is a cross section of a side view of FIG. 8(a)
Figure 9B:
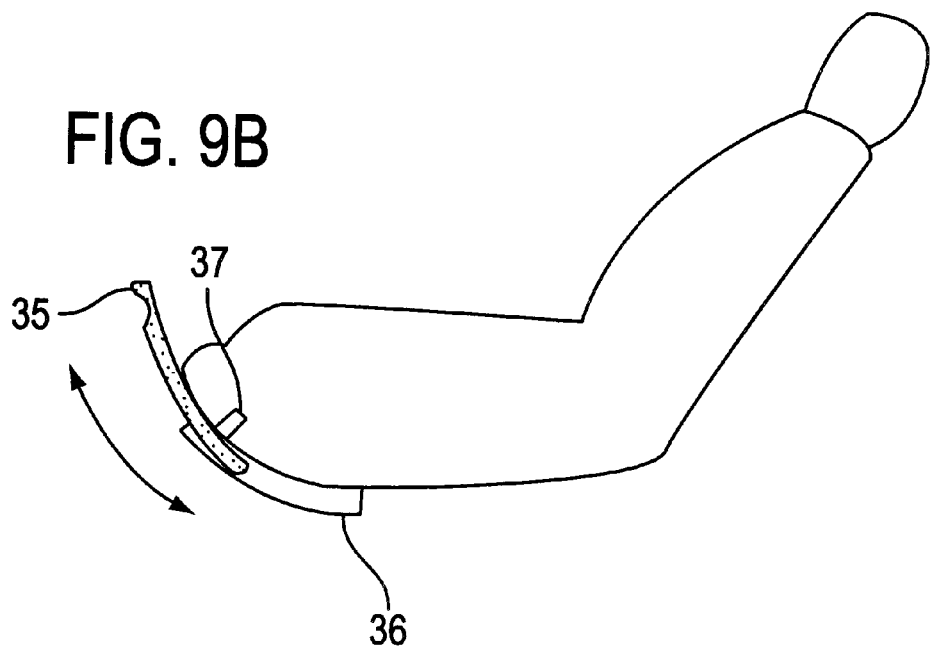
FIG. 9(b) is a cross section of a side view of FIG. 8(b).

As illustrated in FIG. 9(a), the reciprocable member is secured on a track 36 for reciprocatively moving from a position wherein it is below the seat portion, to a position extended from below the seat portion (FIG. 9(b)). A release button 37, is positioned on the side of the seat portion for fixing and releasing the reciprocable member.

Figure 10A:
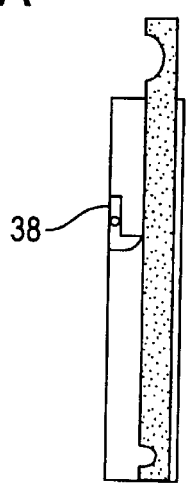
FIGS. 10(a) and (b) represent a cross section of the device according to the invention wherein a spring loaded lever is used to fix the reciprocable member in an extended position.
Figure 10B:
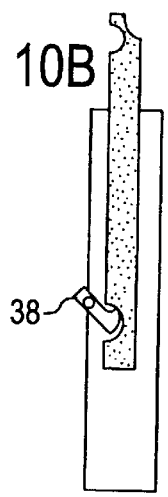
Figure 11A:
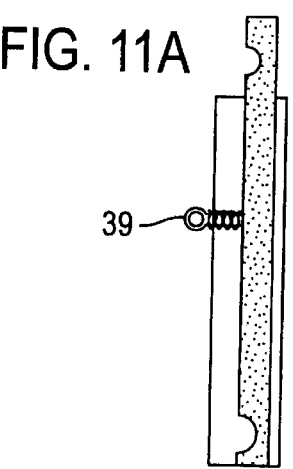
FIGS. 11(a) and (b) represent a cross section of the device according to the invention wherein a spring loaded rivet (or a pin) is used to fix the reciprocable member in an extended position.
Figure 11B:
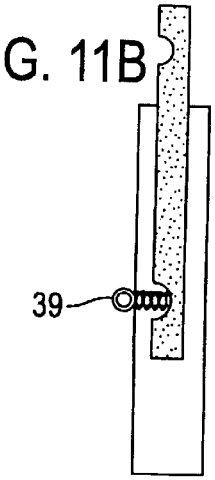
Figure 12A:
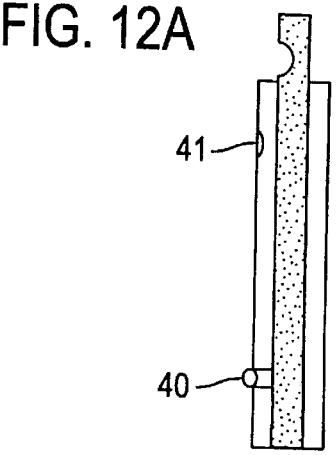
FIGS. 12(a) and (b) represent a cross section of the device according to the invention wherein a spring loaded button extends from the reciprocable member through an opening in a wall portion of the housing unit to fix the reciprocable member in an extended position.
Figure 12B:
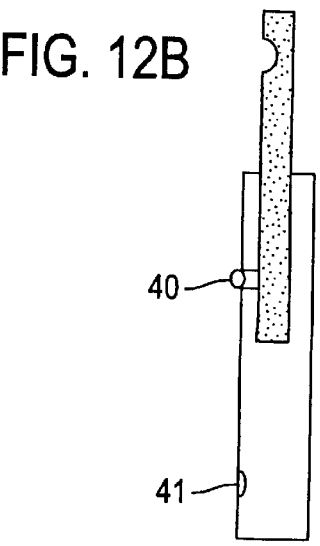

FIGS. 10 to 12 illustrate means for fixing the reciprocable member. In FIGS. 10(a) and (b), a spring loaded lever 38 is used to fix the reciprocable member in an extended position. The lever is depressed to release to reciprocable member from a fixed position.

In FIGS. 11(a) and (b) a spring loaded rivet 39 (or a pin) is used to fix the reciprocable member in an extended position. The rivet is pulled to release the reciprocable member.

In FIGS. 12(a) and (b) a spring loaded button 40 extends from the reciprocable member through an opening 41 in a wall portion of the housing unit to fix the center piece in an extended position. The button is depressed to release the reciprocable member.

Figure 13:
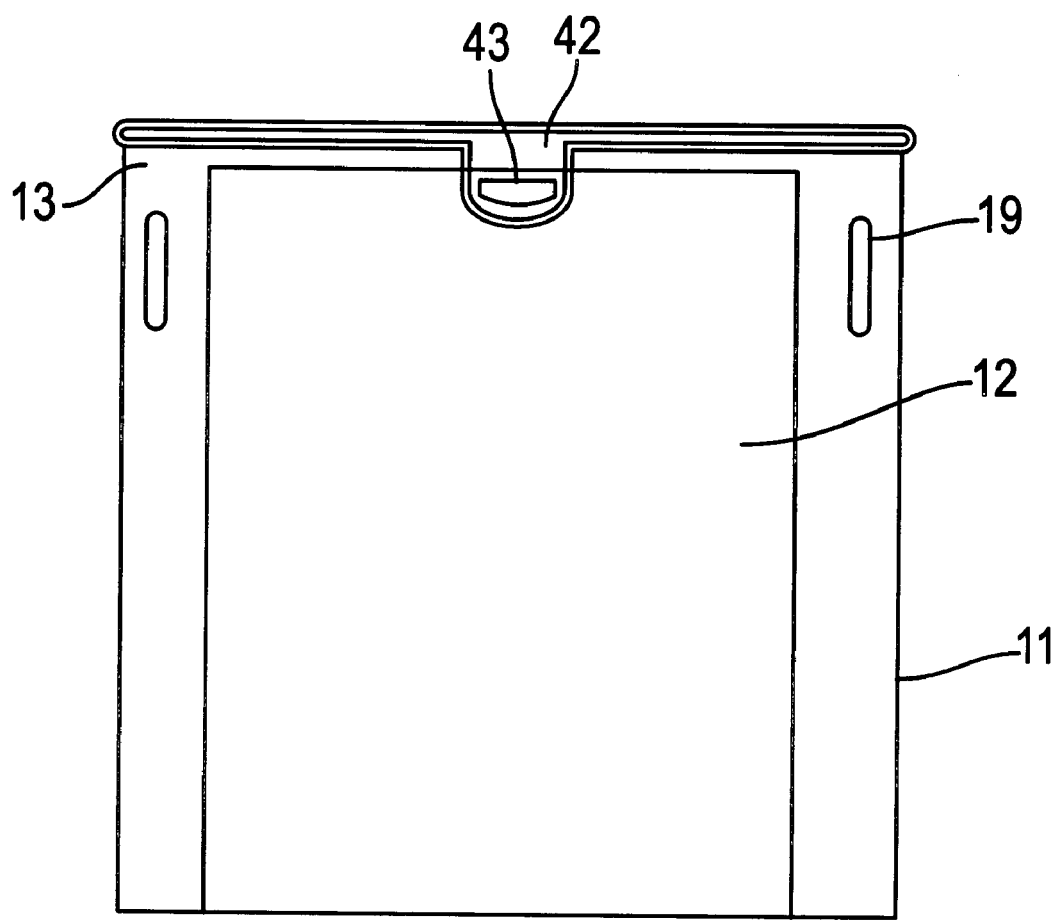
FIG. 13 represents an embodiment wherein a recess is positioned in a wall portion of the housing unit for gripping the reciprocable member.

As illustrated in FIG. 13, a recess 42 is positioned in a wall portion 13 of the housing unit 11 for easily gripping a gripping portion 43 of the reciprocable member 12. The slots 19 in the wall member portions are of a size so that the hook strap may extend and pass through the slots.

While the invention has been illustrated and described with respect to illustrative embodiments and modes of practice, it will be apparent to those skilled in the art that various modifications and improvements may be made without departing from the scope and spirit of the invention. Accordingly, the invention is not to be limited by the illustrative embodiments and modes of practice.

I claim:

1. A device for restricting the movement of objects comprising:

a housing unit having a first face wall portion and a second face wall portion and having side wall portions which extend between and are integral with the face wall portions so that the wall portions define an exterior housing wall surface and an interior housing wall surface which defines a housing unit cavity and having an opening which extends from the exterior wall surface through the interior wall surface and into the cavity;

a reciprocable member having a first face wall portion and a second face wall portion and having side wall portions which extend between and are integral with the reciprocable member face wall portions and which is configured and positioned for reciprocable movement from and between a position where substantially all of the reciprocable member is contained by the housing unit within the cavity, to a position where the reciprocable member is extended from the housing unit so that less than substantially all of the reciprocable member is contained by the housing unit within the cavity;

means for fixing the reciprocable member at a position within the cavity so that at least a portion of the reciprocable member is contained by the housing unit;

wherein the reciprocable member has a track continuous with a wall portion of the reciprocable member and the means for fixing extends from an interior wall surface and into the track for guiding the reciprocable member from and between a position where substantially all of the reciprocable member is contained by the housing unit to a position where the reciprocable member is extended from the housing unit so that less substantially all of the reciprocable member is contained by the housing unit; and means for securing the housing unit to a seat portion of a vehicle seat.

2. A device according to claim 1 wherein the opening is configured and positioned in the housing unit for guiding the reciprocable member from and between a position where substantially all of the reciprocable member is contained by the housing unit to a position where the reciprocable member is extended from the housing unit so that less than substantially all of the reciprocable member is contained by the housing unit.

3. A device according to claim 2 wherein the reciprocable member has a recessed portion which extends into a reciprocable member wall surface and the means for fixing extends from an interior wall surface and into the recessed portion for fixing a position of the reciprocable member.

4. A device according to claim 1 wherein the means for securing the housing unit is a velcro belt having a loop strap and a hook strap.

5. A device according to claim 4 wherein the hook strap has a hook side and an adhesive side and the adhesive side contacts an exterior housing wall surface for fixing the hook strap to the housing unit.

6. A device according to claim 4 further comprising slots in the housing unit, wherein each of the slots extends through the housing unit face wall portions at a position between a side wall portion of the housing unit and adjacent to a side wall portion of the reciprocable member and the hook strap has a hook side and an opposite flat side and the hook strap extends across a face wall portion of the housing unit and through each of the slots so that the flat side is adjacent the face wall portion which the hook strap extends across.

7. A device according to claim 1 wherein the means for fixing the reciprocable member is a rivet which extends from an interior wall surface for contacting the reciprocable member.

8. A device according to claim 7 wherein the rivet is made of a material selected from the group consisting of plastic and metal.

9. A device according to claim 1 wherein the means for fixing the reciprocable member is a means selected from the group consisting of a lever, a rivet, a pin and a button.

10. A device according to claim 1 wherein the device is made of a material selected from the group consisting of plastic, a plastic composite, a metal and wood.

* * * * *